United States Patent [19]

Monahan

[11] Patent Number: 5,217,787
[45] Date of Patent: Jun. 8, 1993

[54] COMPOSITE SHEET MATERIAL AND MOP EMBODIMENT THEREOF

[75] Inventor: Patrick H. Monahan, Arcola, Ill.

[73] Assignee: The Thomas Monahan Co., Arcola, Ill.

[21] Appl. No.: 697,788

[22] Filed: May 9, 1991

Related U.S. Application Data

[63] Continuation of Ser. No. 399,833, Aug. 29, 1989, abandoned, which is a continuation of Ser. No. 101,396, Sep. 28, 1987, abandoned.

[51] Int. Cl.$^5$ .............. A47L 13/20; B32B 3/26
[52] U.S. Cl. .................. 428/134; 15/229.1; 15/244.4; 428/136; 428/181; 428/286; 428/287; 428/304.4; 428/316.6; 428/317.1; 428/317.7
[58] Field of Search ........... 15/147 R, 229.1, 229.2, 15/229.7, 244.1, 244.4, 250.41; 428/134, 136, 181, 286, 287, 304.4, 316.6, 317.1, 317.7

[56] References Cited

U.S. PATENT DOCUMENTS

| | | | |
|---|---|---|---|
| 2,320,372 | 1/1943 | McCarthy | 15/229.7 |
| 2,354,969 | 8/1944 | Trindl et al. | 15/147 R |
| 2,514,496 | 7/1950 | Jones et al. | 15/223 |
| 3,228,820 | 1/1966 | Samson | 428/316.6 |
| 3,355,535 | 11/1967 | Hain et al. | 428/316.6 |
| 3,687,797 | 8/1972 | Wideman | 428/316.6 |
| 3,827,099 | 8/1974 | Allaire et al. | 15/229.1 |
| 4,097,952 | 7/1978 | Lindstrom | 15/229.1 |
| 4,114,224 | 9/1978 | Disko | 15/229.1 |
| 4,288,884 | 9/1981 | Bahls | 15/229.2 |
| 4,313,774 | 2/1982 | Arthur | 15/229.1 |
| 4,553,283 | 11/1985 | Speth | 15/250.41 |
| 5,027,468 | 7/1991 | Leventhal et al. | 15/229.1 |

Primary Examiner—William J. Van Balen
Attorney, Agent, or Firm—R. William Graham; H. Stanley Muir

[57] ABSTRACT

Material multi-faceted as to its advantageous properties and highly versatile in use and application comprises a very light, relatively thin, sheet-like structure, a layered composite of cellular and non-woven materials. Said structure is formed of layered sheets, bonded to one another, including a thin sheet of a cellular material the face(s) of which have a very thin sheet-like overlay of a non-woven permeable reinforcing material such as, preferably, rayon or nylon. The body of the cellular sheet material, preferably of plastic such as polyurethane, polyester or polyether, is characterized by innumerable extremely small, relatively minute pockets having extremely thin elastic wall portions through which fluid may readily pass to said pockets to store therein in amounts the volume of which may be a significant multiple of that originally defined by said wall portions. Exmbodiments of such sheet-like structure are formed and conditioned to readily filter, pass or store fluid and substantially fully release fluid stored therein when under the influence of a moderate application of pressure. When the fluid is a liquid the extent and speed of its release insures a quick drying of this material. An illustrative demonstration of the invention comprises a short length of said sheet-like structure having multiple slits portions of which define lines upon which it can be quickly folded on itself and produce a layered mop which is extremely light in weight and even more effective in application to its intended use than the original form of said sheet-like structure.

9 Claims, 2 Drawing Sheets

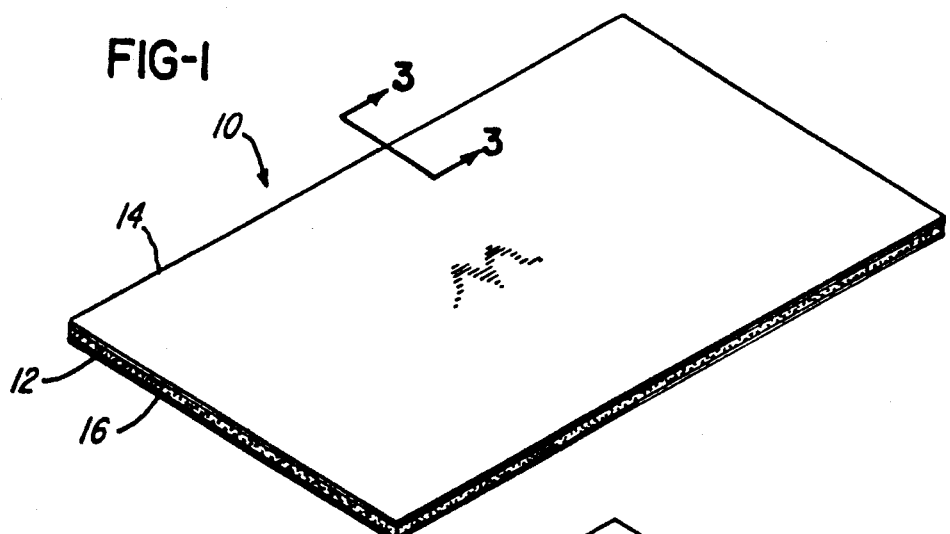
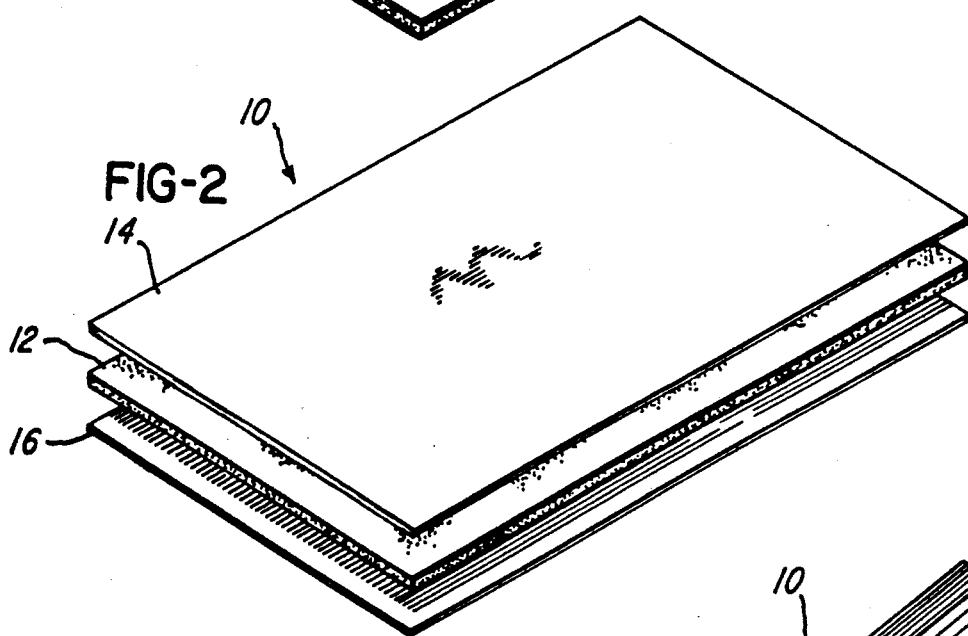
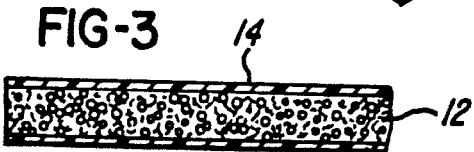
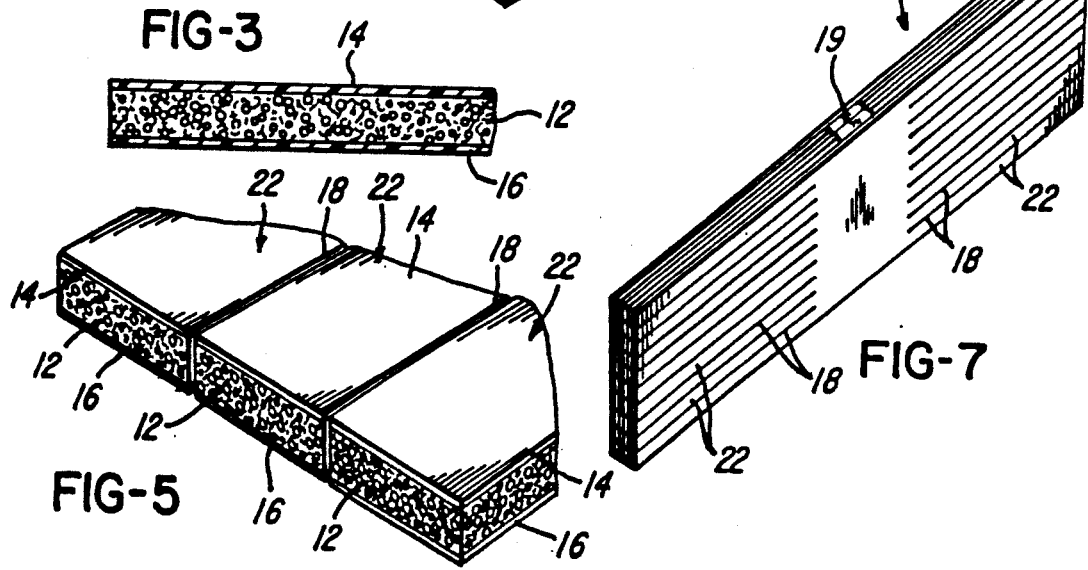
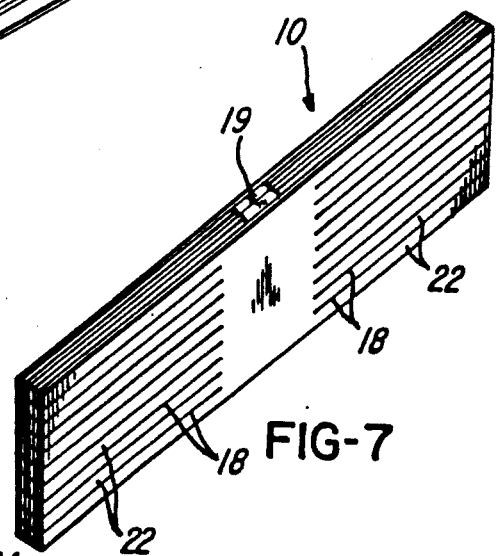

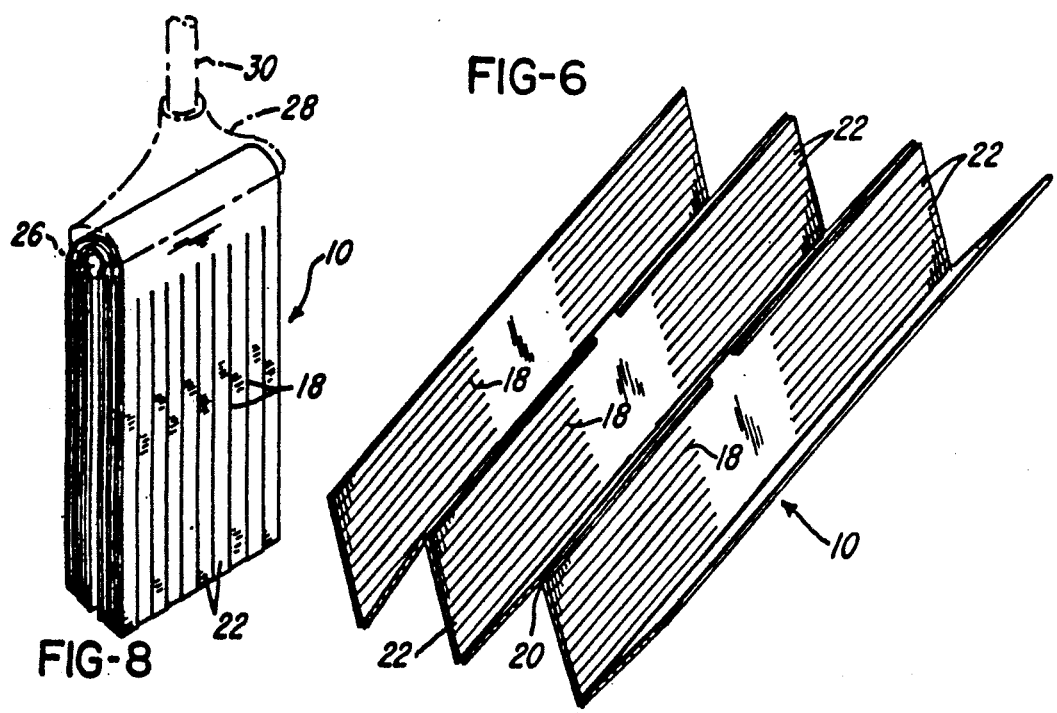
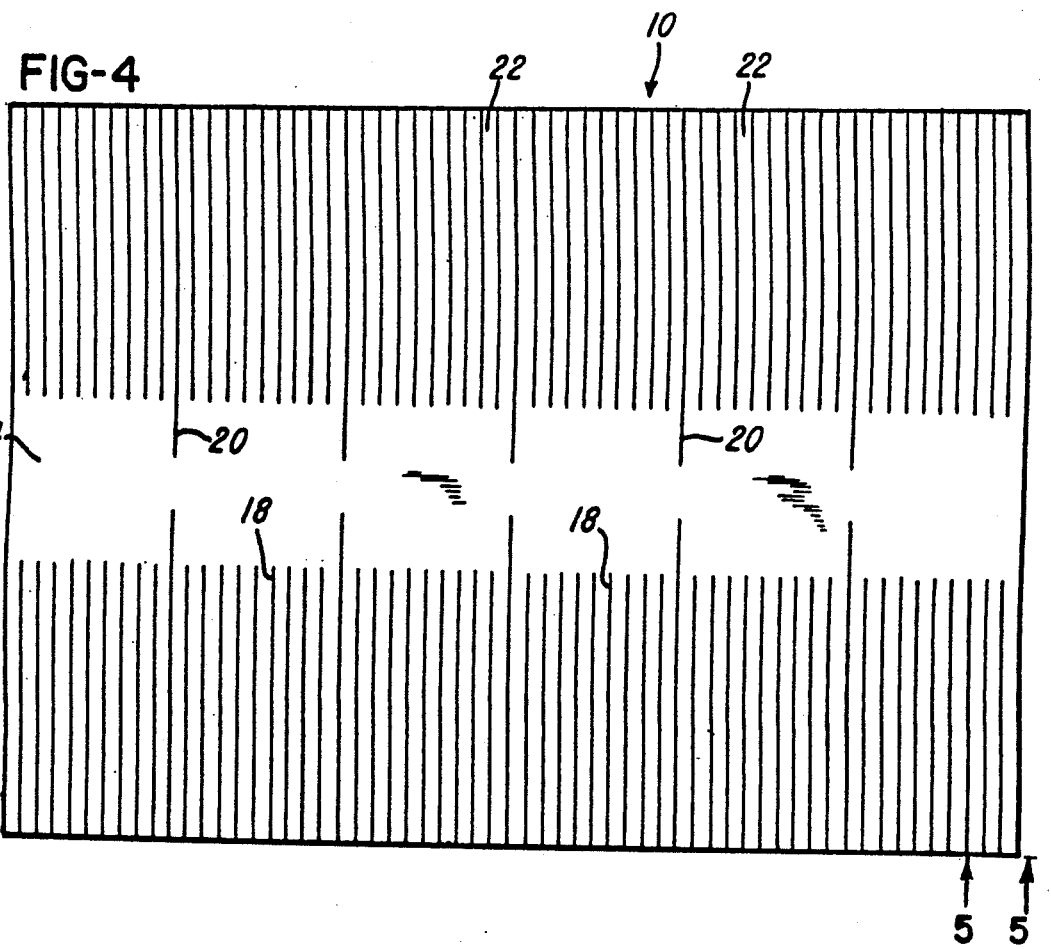

COMPOSITE SHEET MATERIAL AND MOP EMBODIMENT THEREOF

This is a continuation of application Ser. No. 07/399,833 filed Aug. 29, 1989 is now abandoned which in turn is a continuation of application Ser. No. 07/101,396 filed Sep. 28, 1987 is now abandoned.

BACKGROUND OF THE INVENTION

This invention relates to a new and improved composite sheet material embodiments of which, as compared to prior devices and materials having similar application, are extremely light in weight; have an unusually high capacity for absorption of liquid as related to their size; feature an ability to readily, quickly and substantially fully release absorbed liquid in an unusually short period of time on application of pressure; have the capacity to be repeatedly and easily laundered without any perceptible detrimental effect on their original capacity or function; dry in a relatively short period of time; and have a significant capacity to filter fluids. Furthermore, the properties of the material of the invention lend it an ability to serve an important function as both a sound and a thermal insulation medium.

In addition to the foregoing there is ease, simplicity and economy in the manufacture of the composite sheet material of the invention the benefits of which are widely extended in the fabrication of those products into which such sheet material may be formed or of which said material may form a part.

Material per the present invention was found in the first instance to be especially advantageous in the application thereof to the fabrication of new and improved mops which were made and tested in the course of development of this material and like device and is herein described in this frame of reference, but only by way of example and not by way of limitation either as to its application or the form or size of its embodiment as a material per se or as to the form or nature of the significantly improved products which may derive therefrom in whole or in part.

As a matter of fact, the present invention comprehends the use of the material thereof in various embodiments of a ultilitarian nature other than mops, such as, for example, filters, insulators, pads for humdifiers, numerous types of cleaning implements, devices for use in pick up and removal of large and small bodies of liquid waste, sweat absorbing devices, paint rollers and like articles, applicators for various liquid chemicals and wick type devices which will contribute highly advantageous benefits and improvements to the particular art to which each of such devices relate.

As to the prior art, including that cited in the above referred to pending application for U.S. Letters patent Ser. No. 07/101396, attention is directed to U.S. Pat. Nos. 1,027,209; 2,320,372; 2,514,496; 2,354,969; 2,514,496; 3,228,820 3,355,535; 3,748,682; 3,827,099; 4,097,952; 4,114,224; 4,288,884; 4,313,774 and 4,553,283. The foregoing references exhibit the extent of background knowledge of which those substantively involved in the preparation of this disclosure are aware. They know of no prior art which is specifically pertinent to the particular points of novelty herein set forth as forming part of the present invention.

SUMMARY OF THE INVENTION

Embodiments of the material of the present invention basically comprise superposed, bonded, thin layers of sheet material selectively formed of a cellular material and a non-woven hydrophilic material. The body of the cellular material is characterized by innumerable relatively minute pockets having extremely thin elastic wall portions through which fluid may readily pass to and be temporarily stored in said pockets in amounts the volume of which is a significant multiple of that originally defined by said wall portions. At the same time the material as well as the construction of the layered structure of said sheet material is so arranged as to most rapidly and essentially fully release stored fluid in response to a simple squeezing thereof.

The cellular material is preferably a polyurethane, a polyester or polyether and the non-woven hydrophilic material preferably rayon or nylon.

An embodiment of the invention material advantageous for use in effecting a new and improved mop or other device which has particularly significant liquid absorption and storing capabilities and/or filtering capabilities for its size and weight has the form of a relatively thin sheet-like layered structure the layers of which include an interior portion defined by said cellular material, face portions of which have an extremely thin sheet-like reinforcing permeable overlay of said non-woven material. Preferably, successively adjacent layers of said composite are respectively formed of the aforesaid preferred cellular plastic and non-woven materials and successively adjacent thereof are bonded together by an applied hydrophilic binder, the particular materials utilized bein dependent on the application of the end product.

More generally, embodiments of the sheet-like structure of the invention are formed and conditioned to readily filter, pass or store fluid and substantially fully release fluid stored therein when under the influence of a moderate application of pressure. When the fluid is a liquid the extent and speed of its release insures a quick drying of this material. An illustrative demonstration of such embodiments in the form of a mop comprises a short length of said sheet-like structure having multiple slits, portions of which define lines upon which the slit material can be quickly folded on itself in the manner of an accordian pleat and produce from this single piece of material a new and improved substantially layered mop which is very light for its bulk and includes numerous flat superposed narrow strip portions of the layered structure of the material wherein there is a maximalized exposure of its cellular component. The result is a mop wherein all the aforementioned properties and benefits of the invention material are enhanced. The end product is a most significant contribution to the particular art to which it relates.

In addition to the first mentioned properties, improvements, benefits and advancements which embodiments of the present invention contribute to those segments of industrial technology to which they particularly apply, a very important benefit and contribution thereof is that their properties and nature is such to facilitate not only the cleaning thereof but also cleanliness in their use and storage, the result of which is a less strenuous and more efficient and satisfactory use thereof and the development of fresh, pleasant and healthy conditions and personal morale in the environments to which they apply. This is in distinct contrast, for example, to problems frequently experienced in use of prior art apparatus for similar purposes. For example, in this respect, prior art mops are frequently most difficult to wring out and properly clean, as a result of which their efficiency diminishes rapidly and they propagate bacteria and undesirable smells in the areas in which they are used and stored.

A primary object of the present invention is to provide new and improved sheet material, particularly advantageous for use in the production of mop up devices but multi-faceted as to its application, which is simple and economical to fabricate, readily adaptable to a wide variety of products having a considerable range of domestic and industrial usages and applications in which they are most efficient and satisfactory in use, unlikely to malfunction and easy to maintain in a clean and effective condition.

Another object is to provide new and improved sheet material and embodiments thereof which, as compared to prior devices and materials having similar application, are extremely light in weight for a given bulk thereof; have an unusually high capacity for absorption of liquid as related to their size; and feature an ability to readily and quickly release absorbed liquid in an unusually short period of time, particularly on application thereto of pressure.

A further object is to provide a new and improved mop having a relatively thin sheet-like construction and a capacity to be repeatedly and easily laundered and relatively quickly dried without perceptible detrimental effect on its original capacity or function.

Another object is to provide a new and improved composite sheet-like material which is readily and inexpensively adaptable for use in the clean up of small or large spills of liquids including those which represent chemical waste.

An additional object is to provide new and improved sheet material which is particularly advantageous not only for use in the simple and inexpensive fabrication of mop up devices but also for use in providing improvements in filters usable in application to both to liquid and gaseous fluids as well as devices having significant sound and thermoinsulating characteristics Another object is to provide new and improved sheet material possessing the advantageous structural features, the inherent meritorious characteristics and the means and modes of embodiment, use and application thereof herein described.

An additional object is to provide new and improved mop up devices possessing the advantageous structural features, the inherent meritorious characteristics and the means and modes of embodiment, use and application thereof herein described.

With the above and other incidental objects in view as will more fully appear in the specification, the invention intended to be protected by Letters Patent consists of the features of construction, the parts and combinations thereof and the mode of operation as herein described or illustrated in the accompanying drawings or their equivalents.

FIG. 1 is a top plan view, in perspective, of an illustrative embodiment of sheet material per the present invention;

FIG. 2 is a similar exploded view illustrating the composite nature of said sheet material;

FIG. 3 is a sectional view taken on line 3—3 of FIG. 1;

FIG. 4 is a plan view of a section of the length of said sheet material in the process of its use in the creation of a new and improved mop;

FIG. 5 is a view taken along line 5—5 of FIG. 4, taken in perspective;

FIG. 6 is a view illustrating further detail of the invention material as exhibited in FIG. 4 and a further step in the fabrication of a mop from the material of FIG. 4;

FIG. 7 exhibits the folded condition of the material of FIG. 4 enabled by the particular slitting therein illustrated; and FIG. 8 is a perspective view of the new and improved mop assembly enabled by the construction of the mopping device illustrated in FIGS. 5-7

Like parts are identified by like numerals throughout the several views of the accompanying drawings.

The illustrative embodiment of the sheet material per the present invention shown in FIGS. 1-3 is a layered structure 10. In this instance the structure 10 is composed of three layers 12, 14 and 16 and the intermediate layer 12 thereof is provided by a relatively thin sheet of a low density cellular material formed preferably of a plastic, such as polyurethane, polyester or polyether, which is so light that it will essentially float on water rather than sink rapidly as conventional fibrous or cellulose mop materials are prone to do. The body of this cellular sheet material is so formed as to be characterized throughout its extent by virtually innumerable relatively minute pockets or cells having extremely thin elastic wall portions through which fluid may pass to store within said pockets in amounts the volume of which may be a significant multiple of that originally defined by said wall portions. As should be readily obvious, by virtue of the fact the thin sheet-like layer of the preferred plastic cellular structure is characterized throughout its extent by virtually innumerable relatively minute pockets or cells having extremely thin elastic wall portions, it is these thin elastic wall portions which bound the pockets and the inherent linking thereof that defines the body of of the thin layer 12.

That face of the layer 12 which is shown uppermost in FIG. 1 is superposed by a very thin layer 14 of a non-woven material, preferably rayon or nylon, which is secured thereto, coextensive therewith, using a adhesive binder and a "flame bonding" process to this end. Similarly fixed to and coextensive with the undersurface of the sheet 12 is a very thin layer 16 of the very same non-woven material as that which constitutes the layer 14, which layer is hydrophilic.

The non-woven layers 14 and 16 are designed to and do lend tensile and wet strength and provide reinforcement to the body of the layer 12.

Another significant feature of the layered structure 10 is that it is basically resilient and flexible and not prone to separation, shedding or linting as is frequently found to be the case in the use of conventional mop material. A further feature of the thin layer of cellular plastic material 12 which, as will be obvious, is generally schematically illustrated in the accompanying drawings, is that, while it is somewhat stiff in its originally fabricated state, as used in and as a part of a mop up device, the walls bounding the innumerable minute pockets or cells thereof throughout its extent become pliable and increasingly effective and resilient in carrying out its liquid absorption, holding and release functions.

It has been found in test that during the use of the above described layered structure for a mopping procedure, it exhibits a suction force on the liquid and particles of dirt thereunder and in the vicinity thereof on the release thereof from a state of compression, in the process of which the liquid to which it is exposed is in effect inhaled thereby to rapidly find its way into the pockets of the cellular body of layer 12. At the same time the construction of non-woven layers 14 and 16 is such that they serve as filters to the outer surfaces of which dirt particles carried by the liquid being inhaled attach as the liquid from which they are separated moves through the layers 14 and 16 to the pockets of the cellular layer 12. The dirt particles may be easily removed from the outer surfaces of the layers 14 and 16, by rinsing, for example.

At the same time, as well as embodiments of the material of the invention being extremely light in weight for a given bulk thereof and having an unusually high capacity for absorption of liquid as related to their size, as has also been determined by test, the material as well as the construction of the layered structure of said sheet material is so arranged as to most rapidly and essentially fully release stored fluid in response to a simple application of pressure, for example as by a squeezing thereof.

The cellular composition of layer 12 as bonded between the preferred very thin non-woven reinforcing layers 14 and 16 facilitate the basic layered sheet structure 10 being fabricated in substantial lengths, each length of which may be wound on a large roll from which short segments can be cut and fabricated into the various end products.

The features of the embodiment of FIGS. 1-3 make the layered material thereof highly suited, as to its form, properties and inherent characteristics, for conversion into a new and improved mop such as seen in FIGS. 4-8 of the accompanying drawings. As a first step in this direction, the sheet-like layered structure 10, here a section of the length of the sheet material of FIGS. 1-3 which is relatively short, has each of its respective ends, which are parallel, intersected by an identical number of slits 18 and 20 which are perpendicular thereto. Since the nature of each of said ends and the slits applied thereto is identical, a discussion of the lower or leading end of the structure 10 and the slits applied thereto should lead to a clear understanding of the construction of both said ends. Thus, giving due consideration to said lower end it will be there seen that the slits 20 are equal in length, somewhat longer that the slits 18 and have the extemities thereof remote from said lower end laterally aligned, in a line parallel to each of the respective ends of the structure 10 and in an adjacent spaced relation to and short of the transverse centerline of the structure 10. At the same time the spacing between adjacent slits and between the laterally outermost slits 18 and the adjacent lateral longitudinally directed edges of the structure 10 is equal. Moreover the slits 20 form lines of demarcation which divide the lateral extent of the structure 10 into six segments of equal width. Also, within each of these six segments there are nine of the slits 18 which are equidistantly and laterally spaced and in laterally centered relation to the lateral bounds of the segment to which they apply. Furthermore, each of the slits 20 which intersect the lower end of the structure 10 is in direct alignment with a corresponding slit 20 which intersects the upper end of the structure 10 as viewed in FIG. 4 and each of the slits 18 at each end is correspondingly aligned with a slit 18 at the other end.

As will be seen from FIG. 6, the paired slits 20 which are laterally spaced define five lines on which the structure 10 can be laterally folded in the manner of an accordian pleat. Furthermore, the spacing between the most adjacent ends of the paired slits 20 provides hinges to facilitate the folding procedure. The consequence of this folding is shown in FIG. 7, whereupon the resultant mop structure may be turned 90 degrees and draped over a support rod 26 applied and suitably fixed to and in the open end of a cap 28 connected to and forming an extension of a mop handle 30. In the process thereof the portion of the structure 10 which previously defined its transverse centerline is now uppermost and nested within the open end of cap 28.

The construction and arrangement of the structure 10 of FIGS. 4-8 and the orientation and nature of its slits 18 and 20 converts the major portion of the length of said structure into a great number of narrow elongated mopping strips 22. The result is a low density mop structure extremely light in weight for its bulk the operative portions of which are the layered structure of the elongate strips 22 wherein the strength and flexibility afforded by the very thin layers of non-woven material 14 and 16 is at a maximum possible by reason of the cut thereof.

Note that the strips 22 are flat rather than round and their width of may be as narrow as that of conventional mop yarns (from about ⅛ to ¼ inch) and they directly expose, to a maximum possible extent, peripheral side and outer end edge portions of the cellular structure of the strips 22. As will be self evident this expedites the effective absorption of liquid and the release thereof from the cellular structure as well and shortens the time and effort required in this process. At the same time, the strength of the strips 22 is such that they cannot be pulled from this mop as readily as individual strands may be caused to separate from a yarn mop.

In addition the strength and facility afforded by the quality and nature of the composition of the sheet material of which the structure 10 is formed facilitates a rapid and relatively waste free cutting therefrom of any variety of pattern required or desired for any particular end product or application thereof, at very reasonable cost.

A major advantage of the material of the invention and the mop fabrication above detailed, in addition to the simplistic and highly economical construction of the end products enabled thereby, is that it institutes a highly desirable improvement in its manufacturing environment. Just as the invention material is lint free in its use, it is lint free in its fabrication per se and the manufacture of its end products, whereas, by way of example, conventional mop manufacturing is fraught with problems not the least of which is the dirt, dust and lint incident thereto and the frequent absence of efficient lint and dust collection equipment, as a result of which those who work in such an environment are many times exposed to a health hazard. Another point of particular consequence in this context is that a mopping device per the present invention in spite of its high capacity for absorption of liquid will so readily and substantially fully release liquid stored therein that even when immediately stored after use it will be dry to the touch in a relatively short period of time as compared to many hours and days that it takes in the case of the regular mops of the prior art.

It should and will be recognized that the selection and construction of the material of the invention may be varied somewhat within the frame of reference and parameters set forth in this disclosure to suit a particular use and/or application thereof and that such falls within the scope and comprehension of this invention.

It should be obvious from the foregoing that the material of the invention is multi-faceted as to its advantageous properties, highly versatile in use and application and that all of the objects of the invention have in fact been achieved.

From the above description it will be apparent that there is thus provided a device of the character described possessing the particular features of advantage before enumerated as desirable, which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A mop composite material, comprising:
   a layer of thin sheet-like resilient flexible low density cellular plastic material;
   a first layer of thin sheet-like non-woven material coextensively bonded to a first surface of said sheet-like cellular plastic material; and
   a second layer of thin sheet-like non-woven material coextensively bonded to a second surface of said sheet-like cellular plastic material, wherein said materials are bonded in a manner to allow fluid to pass to said cellular plastic material while preventing dirt particles from passing to said cellular plastic material at said first surface and said second surface, wherein said cellular plastic material has numerous relatively minute pockets defined therein which are bounded by extremely thin, highly elastic wall portions formed in a manner to readily allow fluid flow therethrough and store the fluid in said pockets in a significantly larger volumetric amount than that originally defined by said walls when dry, and wherein the fluid readily passes therefrom in response to applied pressure.

2. The mop composite of claim 1, wherein said non-woven material provides strenght to said mop composite material in both a wet and dry state.

3. The mop composite material of claim 2, wherein said cellular plastic material is selected from the group of polyester cellular material, polyurethane cellular material and polyether cellular material and said non-woven material is selected from the group of rayon and nylon.

4. A mop head device comprising the mop composite material of claim 2, wherein said composite is flexible and has a plurality of slits defined therein, a portion of said slits forming hinge portions such that said flexible composite is successively folded to produce said mop head device having accordion pleats.

5. The mop head device of claim 31, wherein said composite is in the form of a relatively thin rectangular sheet which is sufficiently flexible to be rolled on itself and is resistant to linting or shredding in the cutting of segments and usage thereof.

6. The mop head device of claim 5, wherein said plurality of slits are laterally spaced throughout the length of said rectangular sheet and extend inwardly from two opposing lateral ends of said rectangular sheet.

7. The mop head device of claim 6, wherein said non-woven material is selected from the group of rayon and nylon and said plastic material is polyether cellular material.

8. The mop head device of claim 7, wherein said materials are flame bonded at said first surface and said second surface.

9. The mop composite material of claim 1, wherein said materials are flame bonded at said first surface and said second surface.

* * * * *

UNITED STATES PATENT AND TRADEMARK OFFICE
CERTIFICATE OF CORRECTION

PATENT NO. : 5,217,787

DATED : June 8, 1993

INVENTOR(S) : Patrick H. Monahan

It is certified that error appears in the above-indentified patent and that said Letters Patent is hereby corrected as shown below:

In claim 2, column 8, line 9, delete "strenght" and substitute --strength--.

In claim 5, column 8, line 23, delete "31' and substitute --4--.

Signed and Sealed this

Eleventh Day of January, 1994

Attest:

BRUCE LEHMAN

Attesting Officer

Commissioner of Patents and Trademarks